Nov. 30, 1937.    W. BRÜCKEL ET AL    2,100,833
DAMPING DEVICE FOR INDICATING INSTRUMENTS
Filed Feb. 17, 1936

Fig.1.

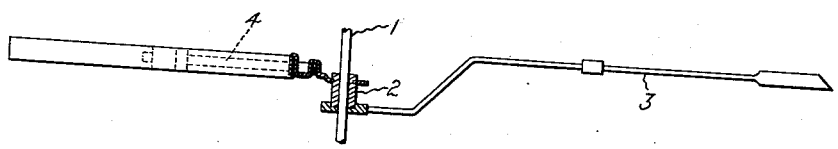

Fig.2.

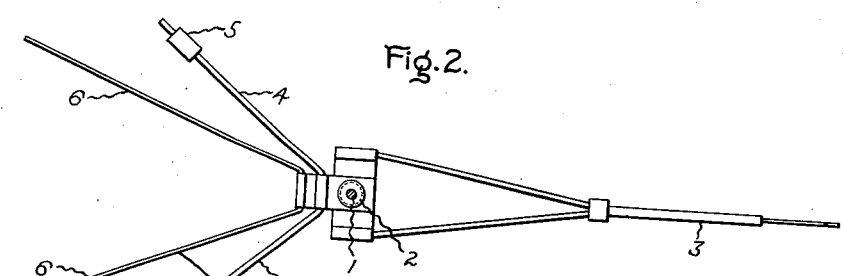

*Flexible vibratory struts tuned to mechanical resonance with the frequency of the alternating current energizing the instrument for preventing mechanical vibration at the frequency of the electrical circuit.*

Fig.3.

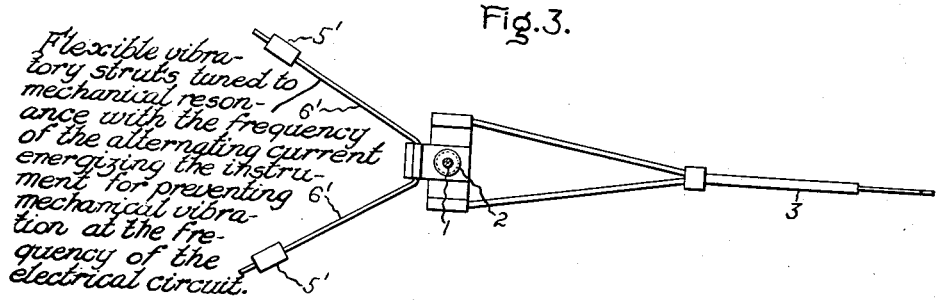

*Flexible vibratory struts tuned to mechanical resonance with the frequency of the alternating current energizing the instrument for preventing mechanical vibration at the frequency of the electrical circuit.*

Inventors:
Waldemar Bruckel,
Karl Haas,
by Harry E. Dunham
Their Attorney.

Patented Nov. 30, 1937

2,100,833

UNITED STATES PATENT OFFICE 2,100,833

DAMPING DEVICE FOR INDICATING INSTRUMENTS

Waldemar Brückel, Berlin-Wilmersdorf, and Karl Haas, Berlin-Britz, Germany, assignors to General Electric Company, a corporation of New York Application February 17, 1936, Serial No. 64,418
In Germany February 28, 1935

5 Claims. (Cl. 171—95)

Our invention relates to damping devices for indicating instruments and other moving systems and has for its principal object overcoming the natural vibrations of movable members, particularly vibrations of alternating-current instruments at or near the frequency of alternating-current systems on which such instruments are used.

Another object is to facilitate the reading of indicating instruments by steadying the pointer.

Other and further objects and advantages will become apparent as the description proceeds.

It has been found that there is a tendency for the moving systems of alternating-current instruments to acquire natural vibrations at a frequency within a range approximately ten cycles above or below the frequency of the alternating-current system. In order to overcome such vibrations, resort has been had to the practice of weighting the movable system until the natural frequency of vibration was greater than the frequency of the forces to which the instruments were likely to be subjected. Weighting the movable system, however, has the disadvantage of either considerably reducing the sensitivity and quality of the instruments or of necessitating an increase in the instrument torque, thus greatly augmenting the wear and tear on the instrument.

In accordance with our invention in its preferred form, we mount one or more easily movable struts at any convenient point in the movable element or system and arrange the struts in such a manner that they will be caused to vibrate at those frequencies at which it is desired to eliminate vibration of the movable system.

The invention will be understood more readily from the following detailed description when considered in connection with the accompanying drawing and those features of the invention which are believed to be novel and patentable will be pointed out in the claims appended hereto. In the drawing, Fig. 1 is a side elevation of a pointer and a portion of the movable element of an indicating instrument; Fig. 2 is a plan view of the apparatus of Fig. 1; and Fig. 3 is a plan view of a modified form of the apparatus of Figs. 1 and 2. Like reference characters are utilized throughout to designate like parts in the drawing.

In the drawing, we have represented at 1 the shaft of the movable element or movable system of an indicating instrument, and, at 2, we have shown a sleeve or bushing for carrying a pointer 3 and compensating or balancing arms 4 on which are adjustably mounted balancing weights 5. The remainder of the movable element, which is not shown, may take any suitable form in accordance with some one of the well known types of indicating instruments.

It will be understood that the balancing weights 5 are so positioned on the arms 4 that the instrument element is in a state of equilibrium or balance; that is, the moment of the balancing weights 5 overcomes the tendency of the eccentric weight of the pointer 3 to unbalance the movable system.

In order to guard against the movable element's and instrument pointer's vibrating and making difficult the reading of the pointer indication, we provide the struts 6 which are composed of flexible material and are of such dimensions as to vibrate readily in response to vibratory forces or impulses of a frequency to which the movable element is likely to be subjected. For example, in the case of instruments for use on 60 cycle alternating-current circuits, there is a tendency for movable elements to acquire a natural frequency of vibration near 60 cycles so that the 60 cycle currents tend to set the movable elements in vibration. In instruments for use on such circuits, we make the natural period of vibration of the struts 6 such that they are set in vibration in response to 60 cycle impulses. In this way, the vibratory forces are absorbed by the flexible struts 6 and the tendency of the movable element and the pointer 3 to vibrate is minimized or overcome.

In instruments having a pair of compensating arms for carrying the balancing weights, we find it convenient to provide a pair of vibrating struts 6 placed between the arms 4. However, if desired, the balancing arms, themselves, may be composed of flexible material and may have such dimensions as to vibrate at a frequency of vibration which is to be eliminated from motion of the movable element. As illustrated in Fig. 3, the vibratory compensating arms 6' are arranged to carry balancing weights 5'.

It will be understood, of course, that, in the arrangement of Fig. 2, the presence of the vibrating arms 6 must be taken into consideration when selecting the weight and position of the balancing weights 5 and likewise, in Fig. 3, the position and weight of the balancing weights 5' must be selected with a consideration both of balancing the pointer 3 and of obtaining the desired responsiveness to vibratory forces in the arms 6'.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States, is:

1. In an electrical instrument for alternating-current circuits of a given frequency, a movable element and connected thereto a flexible strut adapted to vibrate at the frequency of the alternating-current circuit.

2. An indicating instrument, subjected to vibratory forces of a given frequency, and having a movable element and means for overcoming the natural vibration of the moving element, comprising in combination therewith a flexible strut adapted to be set in vibration by impulses of the frequency to which the instrument is subjected.

3. An indicating instrument, subjected to vibratory forces of a given frequency, and having a movable element with a pair of balancing arms and means for overcoming the natural vibration of the movable element comprising in combination therewith a pair of flexible struts between said balancing arms adapted to be set in vibration by impulses of the frequency to which the instrument is subjected.

4. An indicating instrument, subjected to vibratory forces of a given frequency, and having a movable element with an indicating pointer and means for balancing said pointer and overcoming the natural vibration of the movable element, comprising in combination therewith a balancing arm having the same moment as said pointer, composed of elastic material, and adapted to be set in vibration by impulses of the frequency to which the instrument is subjected.

5. A deflecting indicating instrument for an alternating-current circuit of a given frequency including cooperating, deflectable and stationary members and, connected to the deflectable member, a flexible strut having a natural frequency of vibration corresponding to the frequency of the alternating-current circuit.

WALDEMAR BRÜCKEL.
KARL HAAS.